(12) United States Patent
Adams et al.

(10) Patent No.: US 10,690,555 B2
(45) Date of Patent: Jun. 23, 2020

(54) COMPOSITE AIRSPEED INDICATOR DISPLAY FOR COMPOUND AIRCRAFTS

(71) Applicant: Sikorsky Aircraft Corporation, Stratford, CT (US)

(72) Inventors: David L. Adams, Wallingford, CT (US); Kevin Ron Fimbers, Seymour, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 324 days.

(21) Appl. No.: 15/892,045

(22) Filed: Feb. 8, 2018

(65) Prior Publication Data

US 2019/0113403 A1    Apr. 18, 2019

Related U.S. Application Data

(60) Provisional application No. 62/573,332, filed on Oct. 17, 2017.

(51) Int. Cl.
| | | |
|---|---|---|
| *G01L 3/08* | (2006.01) | |
| *B64C 27/00* | (2006.01) | |
| *B64C 27/08* | (2006.01) | |
| *B64D 43/02* | (2006.01) | |
| *B64D 45/00* | (2006.01) | |
| *G01C 23/00* | (2006.01) | |
| *G05D 1/08* | (2006.01) | |
| *B64C 27/22* | (2006.01) | |

(52) U.S. Cl.
CPC .............. *G01L 3/08* (2013.01); *B64C 27/08* (2013.01); *B64D 43/02* (2013.01); *B64D 45/0005* (2013.01); *G01C 23/005* (2013.01); *B64C 27/22* (2013.01); *G05D 1/0858* (2013.01)

(58) Field of Classification Search
CPC ........ G01C 3/08; G01C 23/005; B64C 27/08; B64D 43/02
See application file for complete search history.

(56) References Cited

U.S. PATENT DOCUMENTS

| | | |
|---|---|---|
| D166,245 S | 3/1952 | Dickey et al. |
| 3,685,360 A | 8/1972 | Raznov |
| 5,798,713 A | 8/1998 | Viebahn et al. |
| 6,690,299 B1 | 2/2004 | Suiter |

(Continued)

OTHER PUBLICATIONS

"Abstract future, concept vector . . ." despositphotos.com. Uploaded Jul. 6, 2016. Accessed Jul. 13, 2019. Available online at URL: https://depositphotos.com/115709468/stock-illustration-abstract-future-concept-vector-futurustic.html (Year:2016); p. 1 of 1.

(Continued)

*Primary Examiner* — Jamel E Williams
(74) *Attorney, Agent, or Firm* — Cantor Colburn LLP (57) ABSTRACT

A torque indicator for an aircraft having a main rotor system and a translational thrust system driven by at least one engine includes a first indicator operable to display an actual torque of an engine of the aircraft relative to an engine torque limit, a second indicator operable to display an actual torque of the translational thrust system of the aircraft relative to a translational thrust system torque limit, and a third indicator operable to display an actual torque of the main rotor system of the aircraft relative to a main rotor system torque limit.

20 Claims, 5 Drawing Sheets

(56) References Cited

U.S. PATENT DOCUMENTS

| | | |
|---|---|---|
| 6,832,138 B1 | 12/2004 | Straub et al. |
| D513,485 S | 1/2006 | Pfeiffer |
| 7,268,702 B2 | 9/2007 | Chamas et al. |
| 7,295,135 B2 | 11/2007 | Younkin |
| 7,313,962 B1 | 1/2008 | O'Neil |
| D589,388 S | 3/2009 | Sauter |
| 7,765,061 B1 | 7/2010 | Barber et al. |
| D654,415 S | 2/2012 | Mizuno |
| D656,440 S | 3/2012 | Klein |
| 8,354,943 B2 | 1/2013 | Bacabara et al. |
| 8,421,649 B2 | 4/2013 | Marstall et al. |
| 8,462,020 B1 | 6/2013 | Vanhoozer et al. |
| D713,411 S | 9/2014 | Gall et al. |
| D726,758 S | 4/2015 | Bourret et al. |
| D733,181 S | 6/2015 | Manfredo et al. |
| D734,773 S | 7/2015 | Barbato |
| D741,879 S | 10/2015 | Chapman et al. |
| 9,233,761 B2 | 1/2016 | Yamasaki |
| D752,089 S | 3/2016 | Cru et al. |
| D754,713 S | 4/2016 | Zhang et al. |
| D763,883 S | 8/2016 | Kim et al. |
| D766,976 S | 9/2016 | McElreath |
| D769,927 S | 10/2016 | Kim et al. |
| D773,532 S | 12/2016 | Gauci et al. |
| D778,952 S | 2/2017 | Kim et al. |
| D780,799 S | 3/2017 | Mehring et al. |
| D790,561 S | 6/2017 | Torchin et al. |
| 9,674,426 B2 | 6/2017 | Penha et al. |
| D792,434 S | 7/2017 | Dzjind et al. |
| D797,116 S | 9/2017 | Chapman et al. |
| D802,608 S | 11/2017 | Hicks et al. |
| D805,540 S | 12/2017 | Kim et al. |
| D809,535 S | 2/2018 | Park et al. |
| D820,293 S | 6/2018 | Poel et al. |
| D823,333 S | 7/2018 | Hiratsuka et al. |
| D834,587 S | 11/2018 | Torchin et al. |
| D843,381 S | 3/2019 | Wassell et al. |
| D845,317 S | 4/2019 | Wellmeier et al. |
| D846,582 S | 4/2019 | Valladares et al. |
| D847,180 S | 4/2019 | Wan et al. |
| D847,830 S | 5/2019 | Chapman et al. |
| D850,479 S | 6/2019 | Snellman et al. |
| D850,482 S | 6/2019 | Amini et al. |
| 10,310,724 B2 | 6/2019 | Kresl et al. |
| D852,820 S | 7/2019 | Sanchez |
| 2004/0125587 A1 | 7/2004 | Wada et al. |
| 2005/0143871 A1 | 6/2005 | Boorman et al. |
| 2005/0222766 A1 | 10/2005 | Burch |
| 2005/0262451 A1 | 11/2005 | Remignanti et al. |
| 2009/0121901 A1 | 5/2009 | Namier et al. |
| 2009/0281684 A1 | 11/2009 | Spek |
| 2010/0157742 A1 | 6/2010 | Relyea et al. |
| 2010/0302073 A1 | 12/2010 | Fernandez |
| 2011/0063137 A1 | 3/2011 | Pimouguet et al. |
| 2011/0205090 A1 | 8/2011 | Marstall et al. |
| 2011/0213514 A1 | 9/2011 | Baxter |
| 2012/0105318 A1 | 5/2012 | Nutaro et al. |
| 2012/0159370 A1 | 6/2012 | Rode et al. |
| 2012/0299753 A1 | 11/2012 | Thoreen |
| 2013/0226375 A1 | 8/2013 | Peter et al. |
| 2013/0346858 A1 | 12/2013 | Neyrinck |
| 2014/0059482 A1 | 2/2014 | Won |
| 2014/0339372 A1 | 11/2014 | Dekel et al. |
| 2016/0059960 A1 | 3/2016 | Fearn et al. |
| 2016/0147406 A1 | 5/2016 | Yi |
| 2016/0178464 A1* | 6/2016 | Burns ................... F02C 3/10 73/112.01 |
| 2016/0179327 A1 | 6/2016 | Zammit-Mangion et al. |
| 2017/0088284 A1 | 3/2017 | Holder |
| 2017/0210461 A1* | 7/2017 | Siu ........................ B64C 27/10 |
| 2018/0134380 A1* | 5/2018 | Wulff ..................... B64C 27/06 |
| 2019/0112071 A1 | 4/2019 | Adams et al. |

OTHER PUBLICATIONS

"File: FGGC.jpg." wiki.flightgear.org. May 9, 2009. Accessed Jul. 13, 2019. Available online at URL: http://wiki.flightgear.org/File:FGGC.jpg (Year: 2009); p. 1 of 1.

"File: PFD 20180406.png." wiki.flightgear.org. Apr. 6, 2018. Accessed Jul. 13, 2019. Available online at URL: http://wiki.flightgear.org/File: PRD_20180406.png (Year: 2018); p. 1 of 1.

McKay, Geoff; LearntoFly.ca; "Airspeeds, V-Speeds, Vx, Vy, VsO, Vs1, Va, Vno, Vfe, Vne . . . "; Published Date: Aug. 12, 2010; Accessed Date: Mar. 27, 2019; Available Online at URL: <https://learntofly.ca/airspeeds-v-speeds-vx-vy-vs-vs1-va-vno-vne-vfe/>; 4 Pages.

youtube.com; "Learn to Use QT Design Studio . . . 0:15"; Published Date: Jun. 26, 2018; Accessed Date: Mar. 27, 2019; Available Online at URL: <https://www.youtube.com/watch?v=U91nAFReAoU>; 1 Page.

* cited by examiner

COMPOSITE AIRSPEED INDICATOR DISPLAY FOR COMPOUND AIRCRAFTS

CROSS-REFERENCE TO RELATED APPLICATIONS

This application claims the benefit of U.S. Provisional Application Ser. No. 62/573,332, filed Oct. 17, 2017, which is incorporated herein by reference in its entirety.

BACKGROUND

The present disclosure relates to a display system of a rotary wing aircraft, and more particularly, to systems and methods for enhanced graphical display of operational parameters of a compound, coaxial rotary wing aircraft, with a variable pitch propulsor.

Computer generated aircraft displays have become highly sophisticated and are capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays to display important flight management, navigation, and control information to personnel operating the aircraft.

Primary Flight Displays are computer-generated displays that provide flight crews with real-time visual representations of the operational states of their aircraft during flights. For example, the Primary Flight Display can combine critical flight instrumentation (e.g., altitude, attitude, heading, airspeed, vertical speed instruments) and primary engine instrument indicators into a single, readily interpretable display. As a result, Primary Flight Displays have become effective visual tools for controlling aircraft, reducing pilot workload, increasing situational awareness, and improving overall flight safety.

Conventional displays typically provide information related to engine torque and rotor torque as parameters related to aircraft performance. Compound helicopters, however, typically utilize not only a dual main rotor, but also an auxiliary propulsor. Because the auxiliary propulsor is operable to vary aircraft airspeed, parameters associated with the auxiliary propulsor must also be monitored. Accordingly, the engine torque, torque of both main rotors, and the torque of the auxiliary propulsor must be incorporated into the display. Inclusion of these parameters requires additional display indicators and additional display space allocation, resulting in increased pilot scan times when flying the aircraft.

BRIEF DESCRIPTION

According to an embodiment, a torque indicator for an aircraft having a main rotor system and a translational thrust system driven by at least one engine includes a first indicator operable to display an actual torque of an engine of the aircraft relative to an engine torque limit, a second indicator operable to display an actual torque of the translational thrust system of the aircraft relative to a translational thrust system torque limit, and a third indicator operable to display an actual torque of the main rotor system of the aircraft relative to a main rotor system torque limit.

In addition to one or more of the features described above, or as an alternative, in further embodiments the main rotor system includes an upper rotor system and a lower rotor system, and the third indicator further comprises an indicator operable to display an actual torque of the upper rotor system and an indicator operable to display an actual torque of the lower rotor system.

In addition to one or more of the features described above, or as an alternative, in further embodiments the torque indicator is a linear gage.

In addition to one or more of the features described above, or as an alternative, in further embodiments the first indicator and the second indicator are positioned adjacent sides of the torque indicator and the third indicator is arranged at a center of the torque indicator.

In addition to one or more of the features described above, or as an alternative, in further embodiments comprising a fourth indicator operable to display a digital, numerical readout of the first indicator, the second indicator, and third indicator.

In addition to one or more of the features described above, or as an alternative, in further embodiments the fourth indicator is operable to display a digital numerical readout of a rotor speed of the main rotor system.

In addition to one or more of the features described above, or as an alternative, in further embodiments comprising a fourth indicator operable to display a digital, numerical readout of a collective applied to the main rotor system.

In addition to one or more of the features described above, or as an alternative, in further embodiments the fourth indicator is operable to additionally provide a reference collective command provided to the main rotor system.

In addition to one or more of the features described above, or as an alternative, in further embodiments a color of at least one of the first indicator, second indicator, and third indicator, changes as the actual torque approaches the torque limit.

In addition to one or more of the features described above, or as an alternative, in further embodiments the torque indicator is a portion of a multifunction display unit.

According to another embodiment, a method of displaying a torque of various components of an aircraft includes indicating, via a first indicator, an actual torque of an engine of the aircraft relative to an engine torque limit on a torque display displaying, indicating, via a second indicator, an actual torque of a translational thrust system of the aircraft relative to a translational thrust system torque limit on the torque display, and indicating, via a third indicator, an actual torque of a main rotor system of the aircraft relative to a main rotor system torque limit on the torque display.

In addition to one or more of the features described above, or as an alternative, in further embodiments the torque display includes a linear gage.

In addition to one or more of the features described above, or as an alternative, in further embodiments the main rotor system includes a first rotor and a second rotor and indicating an actual torque of a main rotor system of the aircraft relative to a main rotor system torque limit on the torque display further comprises indicating an actual torque of the first rotor relative to the main rotor system torque limit and indicating an actual torque of the second rotor, separate from the first rotor, relative to the main rotor system torque limit.

In addition to one or more of the features described above, or as an alternative, in further embodiments comprising displaying a digital readout of at least one of the actual torque of the engine, the actual torque of the translational thrust system, and the actual torque of the main rotor system.

In addition to one or more of the features described above, or as an alternative, in further embodiments comprising displaying a digital readout of a rotational speed of the main rotor system.

In addition to one or more of the features described above, or as an alternative, in further embodiments comprising displaying an actual value of a collective of the aircraft.

In addition to one or more of the features described above, or as an alternative, in further embodiments comprising indicating a status of at least one of the actual torque of the engine relative to the engine torque limit, the actual torque of a translational thrust system relative to the translational thrust system torque limit, and the actual torque of a main rotor system relative to the main rotor system torque limit.

In addition to one or more of the features described above, or as an alternative, in further embodiments at least one of the first indicator, the second indicator, and the third indicator, is a first color when the actual torque of the engine is at an allowable level relative to the engine torque limit, the actual torque of a translational thrust system is at an allowable level relative to the translational thrust system torque limit, and the actual torque of a main rotor system is at an allowable level relative to the main rotor system torque limit, respectively.

In addition to one or more of the features described above, or as an alternative, in further embodiments at least one of the first indicator, the second indicator, and the third indicator, is a second color when the actual torque of the engine is approaching the engine torque limit, the actual torque of a translational thrust system is approaching the translational thrust system torque limit, and the actual torque of a main rotor system is approaching the main rotor system torque limit, respectively.

In addition to one or more of the features described above, or as an alternative, in further embodiments at least one of the first indicator, the second indicator, and the third indicator, is a second color when the actual torque of the engine equals or exceeds the engine torque limit, the actual torque of a translational thrust system equals or exceeds the translational thrust system torque limit, and the actual torque of a main rotor system equals or exceeds the main rotor system torque limit, respectively.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
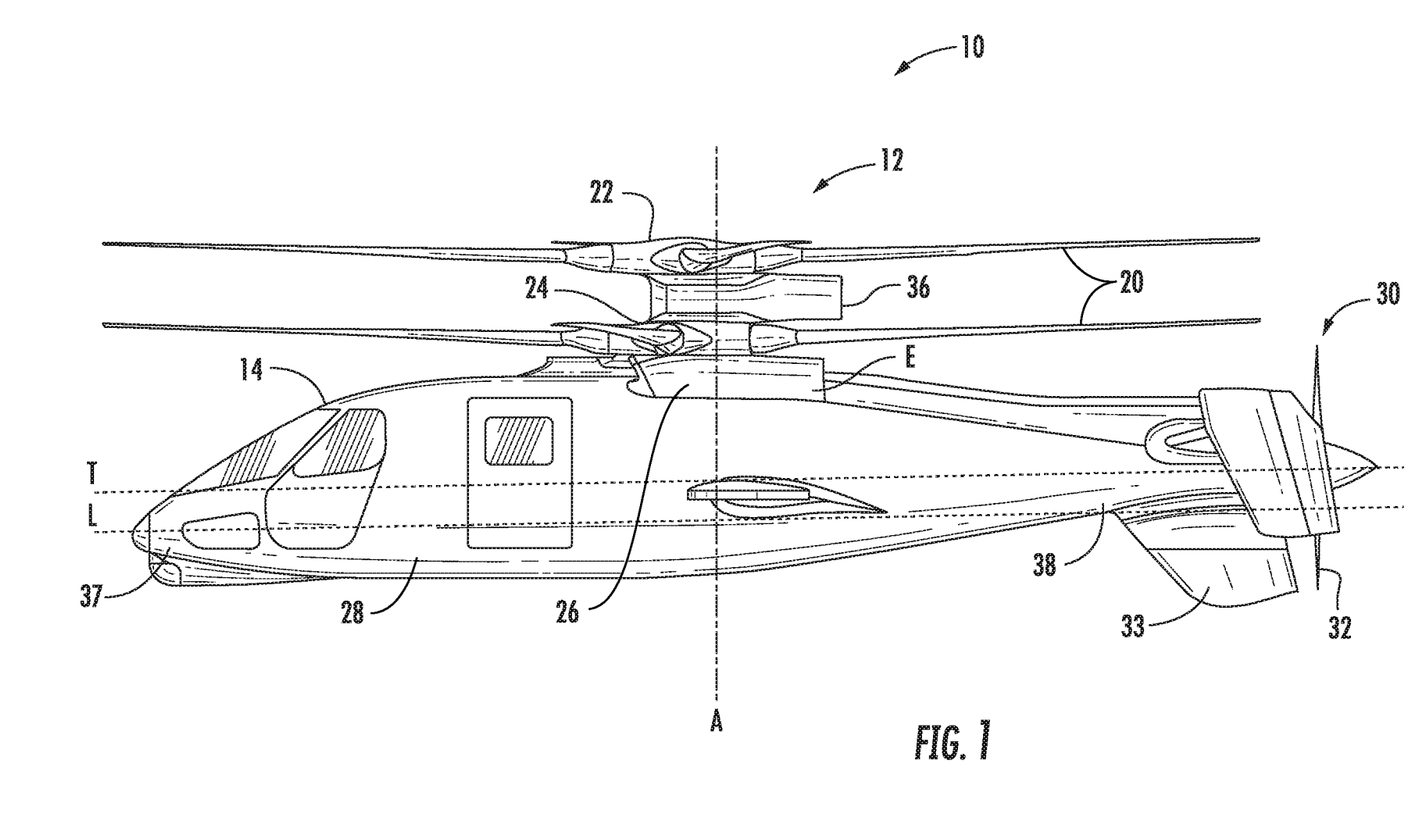
FIG. 1 is side view of an example of a rotary wing aircraft.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in this non-limiting embodiment, other rotary-wing aircraft will also benefit from embodiments of the invention.

The dual, counter-rotating, coaxial rotor system 12 includes an upper rotor system and a lower rotor system. Rotor system 12 includes a plurality of rotor blades 20 mounted to a rotor hub 22, 24 for rotation about rotor axis of rotation A. A plurality of the main rotor blades 20 project substantially radially outward from the hubs 22, 24. Any number of blades 20 may be used with the rotor system 12. The rotor system 12 includes a rotor hub fairing 36 generally located between and around the upper and lower rotor systems such that the rotor hubs 22, 24 are at least partially contained therein. The rotor hub fairing 36 provides drag reduction.

A main gearbox 26 may he located above the aircraft cabin 28 and drives the rotor system 12. The translational thrust system 30 may be driven by the same main gearbox 26 which drives the rotor system 12. The main gearbox 26 is driven by one or more engines (illustrated schematically at E).

The translational thrust system 30 may be mounted to the rear of the airframe 14 with a translational thrust axis, T, oriented substantially horizontal and parallel to the aircraft longitudinal axis L to provide thrust for high-speed flight. The translational thrust system 30 includes a pusher propeller 32 mounted at an aerodynamic tail fairing 33. The translational thrust axis T, corresponds to the axis of rotation of propeller 32. Although a tail mounted translational thrust system 30 is disclosed in this illustrated non-limiting embodiment, it should be understood that any such system or other translational thrust systems may alternatively or additionally be utilized.

Figure 2:
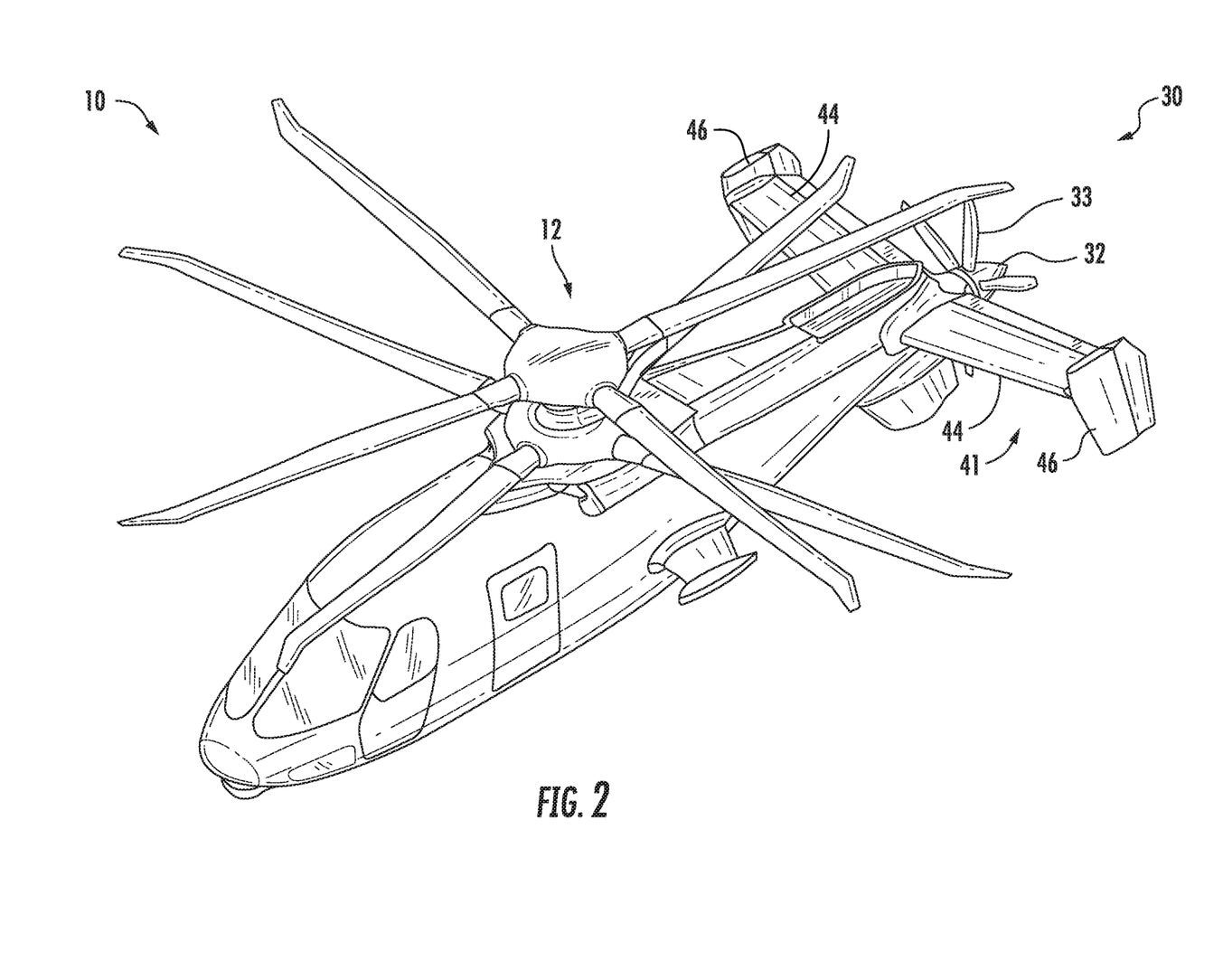
FIG. 2 is a perspective view of the rotary wing aircraft of FIG. 1.

In the example of PIGS. 1 and 2, the auxiliary propulsor 32 includes a plurality of propeller blades 33 and is positioned at a tail section 41 of the aircraft 10. The tail section 41 includes active elevators 44 and active rudders 46 as controllable surfaces, as best seen in FIG. 2. During flight regimes, aircraft pitch attitude and longitudinal velocity demands (i.e., speed) can change independently. Exemplary embodiments control both the main rotor system 12 and the translational thrust system 30 to support a range of aircraft pitch attitudes over a range of aircraft airspeeds.

Figure 3:
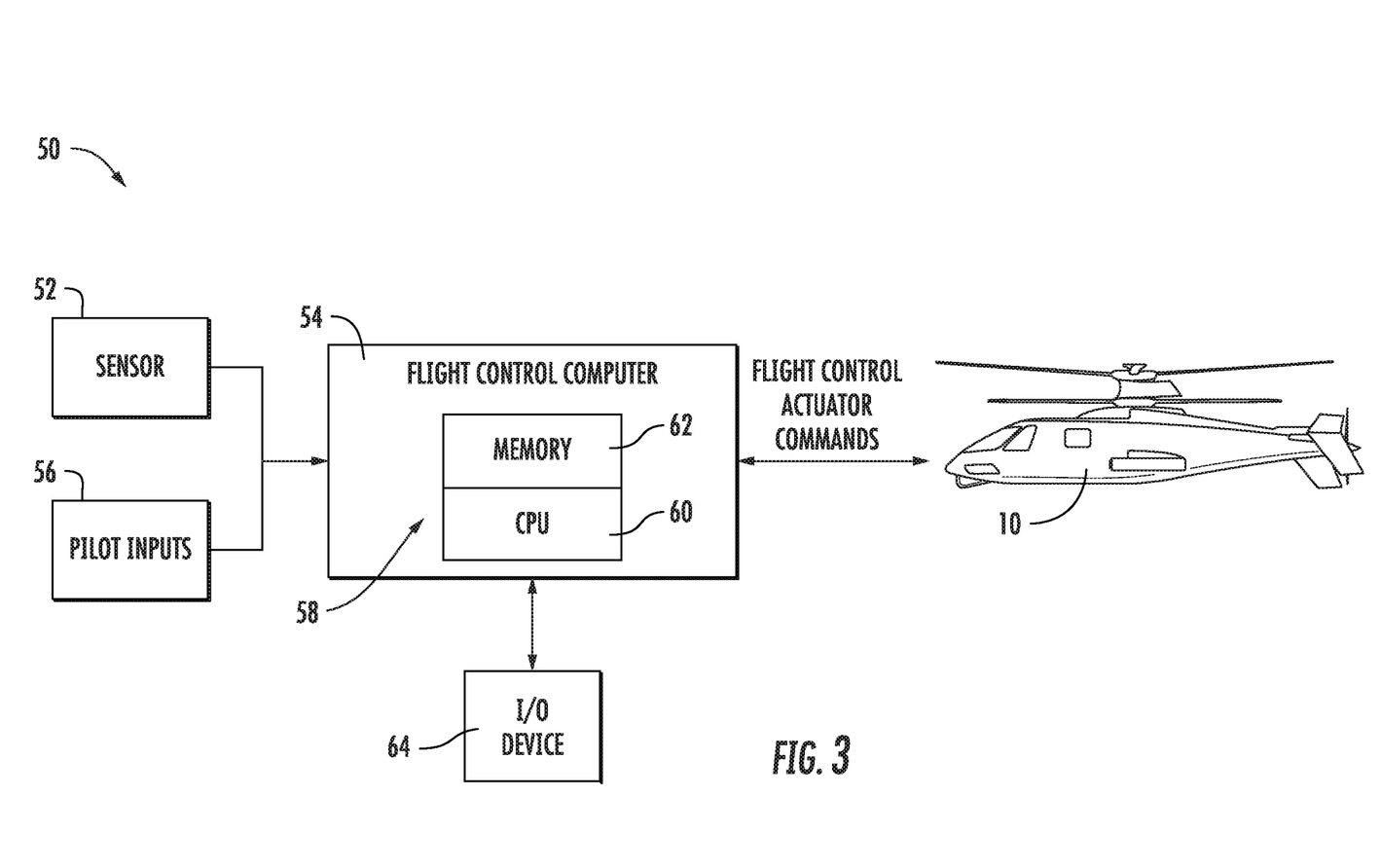
FIG. 3 is a schematic diagram of a control system of a rotary wing aircraft.

FIG. 3 illustrates an example of a control system 50 of an aircraft, such as aircraft 10. In one embodiment, the flight control system 50 is a fly-by-wire (FBW) control system. In a FBW control system, there is no direct mechanical coupling between a pilot's controls and movable components such as rotor blade assemblies 20 or propeller blades 34 of the aircraft 10 of FIG. 1. Instead of using mechanical linkages, a FBW control system 50 includes a plurality of sensors 52 which can sense the position of controlled elements and generate electrical signals proportional to the sensed position. The sensors 52 may also be used directly and indirectly to provide a variety of aircraft state data to a flight controller (FCC) 54. Examples of flight conditions of the aircraft measured by the sensors 52, include, but are not limited to, main rotor rotational speed, rotor torque, rotor blade pitch, propeller rotational speed, propeller torque, airspeed, and thrust for example.

Pilot commands or inputs 56 from pilot inceptors (not shown) are received by the flight controller 54 as a commanded change to one or more components of the aircraft, such as the main rotor system or the translational thrust system for example. Pilot inputs 56 can be in the form of stick commands and/or beeper commands to set and incrementally adjust reference values for controllers. The pilot inputs 56 need not be directly provided by a human pilot, but may be driven by an automatic pilot, a remote control, a navigation-based control, or one or more control loops configured to produce one or more values used to pilot the aircraft 10.

In response to inputs from the sensors 52 and pilot inputs 56, the FCC 54 transmits signals to various subsystems of the aircraft 10, such as the main rotor system 12 and the translational thrust system 30. In an embodiment, rather than simply passing pilot inputs 56 to various subsystems, a processing system 58 operably coupled to or integrated with the FCC 54 applies models and control laws to augment the flight control actuator commands provided to one or more servos or actuators of the aircraft 10.

The processing system 58 includes processing circuitry 60, memory 62, and an interface with at least one input/output device 64. The processing circuitry 60 can be any type or combination of computer processors, such as a microprocessor, microcontroller, digital signal processor, application specific integrated circuit, programmable logic device, and/or field programmable gate array, and is generally referred to as central processing unit (CPU). The memory 62 can include volatile and non-volatile memory, such as random access memory (RAM), read only memory (ROM), or other electronic, optical, magnetic, or any other computer readable storage medium onto which data and control logic as described herein are stored. Therefore, the memory 62 is a tangible storage medium where instructions executable by the processing circuitry 60 are embodied in a non-transitory form.

The I/O device 64 may be used to present information to, and/or receive input selections from, a user (e.g., a pilot). The at least one I/O device 64 may include a display device or screen, audio speakers, a graphical user interface (GUI), etc. it is to be appreciated that the control system 50 is intended as an example only illustrative. In some embodiments, additional components or entities not shown in FIG. 3 may be included. In some embodiments, one or more of the components or entities may be optional. In some embodiments, the components or entities of the control system 50 may be arranged or configured differently from what is shown in FIG. 3.

Figure 4:
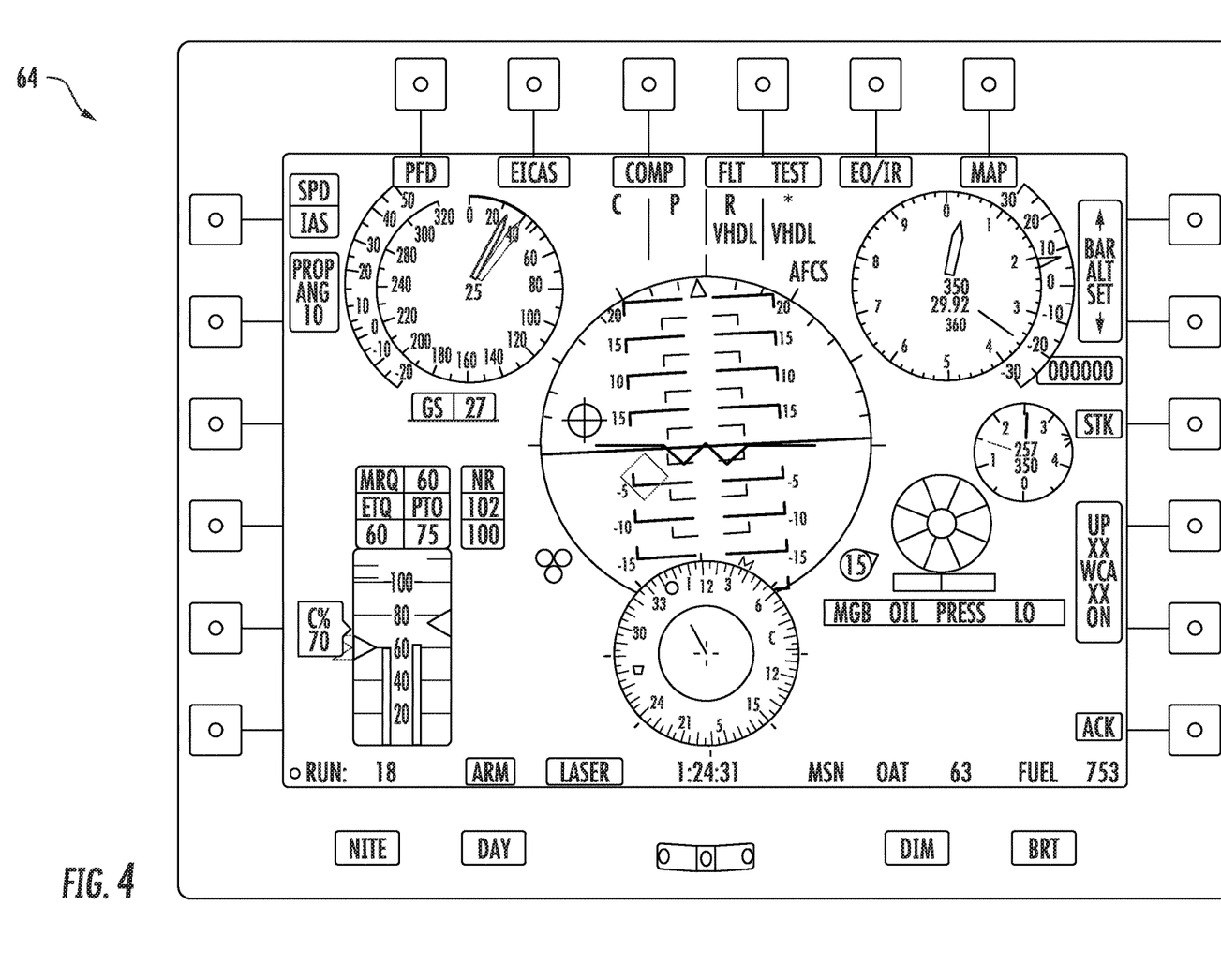
FIG. 4 is a front view of a multifunction display system of a rotary wing aircraft according to an embodiment.

With reference now to FIG. 4, an example of an input/output device 64 of the control system 50 is illustrated in more detail. In an embodiment, the device 64 is a display unit, such as disposed within the cockpit of the aircraft for example. The display unit 64 may be located in front of one of the pilot and copilot, or alternatively, may be located at a position between the pilot and the copilot. In some embodiments, the display unit 64 is supported by an instrument console, while in other embodiments the display unit 64 may be a separate component independently mounted in the cockpit. In yet another embodiment, the display unit 64 may be visible in the windshield of the aircraft, such as via a heads up display for example. In the illustrated, non-limiting embodiment, the display unit 64 includes a multifunction display and includes a plurality of distinct display features, each of which is configured to provide an operator with one or more operating parameters of the aircraft.

Figure 5:
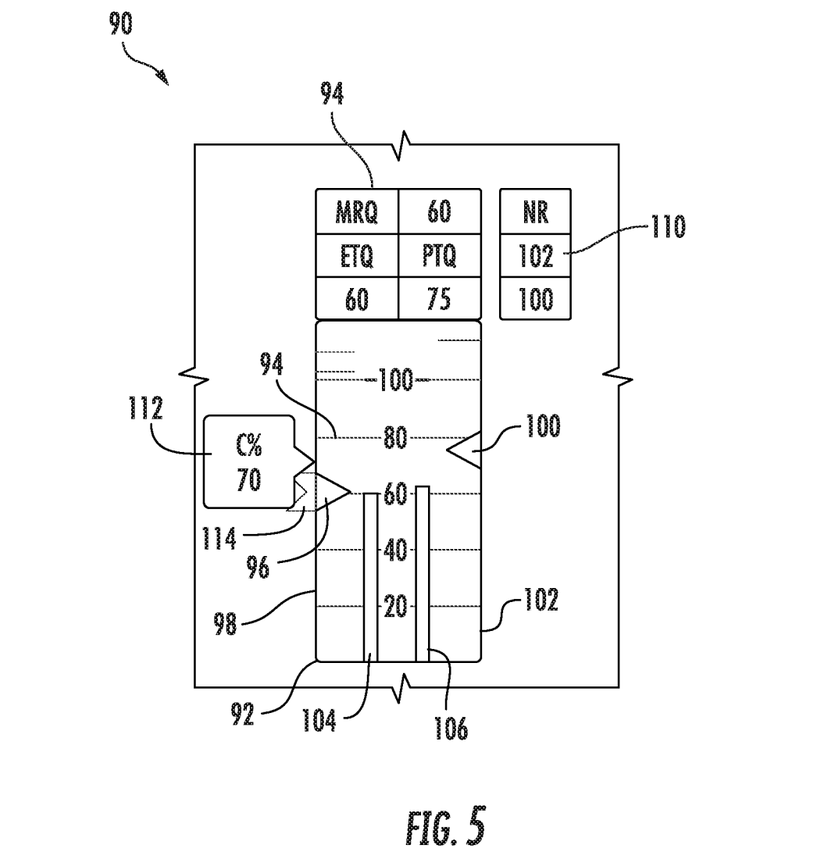
FIG. 5 is a front view of a torque indicator of the display system of FIG. 4 according to an embodiment.

With reference now to FIG. 5, a display 90 of the display unit 64 includes a torque indicator configured to visually indicate a torque of the main rotor system 12, the transla-tional thrust system 30, and the engine E of the aircraft 10. In the illustrated, non-limiting embodiment, the torque indicator 90 includes a linear gage 92 having a plurality of markings 94 spaced at intervals over all or a portion of the height of the gage 92. The markings 94 represent percentages of a torque limit associated with each of the plurality of components being monitored.

A first symbol 96 may be arranged adjacent a first side 98 of the gage 92 and a second symbol 100 may be arranged adjacent a second, opposite side 102 of the gage 92. In an embodiment, both the first and second symbols 96, 100 are inwardly facing triangular carats. However, any suitable symbol is within the scope of the disclosure. The first symbol 96 provides an indication of the actual torque of the engine E of the aircraft 10. More specifically, the first symbol 96 indicates an actual torque of the engine E relative to the torque limit associated with the engine E. In embodiments where the aircraft 10 includes multiple engines E, the engine torque represented may be an average of each of the plurality of engines E. The second symbol 100 may similarly indicate an actual torque of the translational thrust system 30 relative to a torque limit of the translational thrust system 30. A first bar 104 and a second bar 106 arranged at a center of the gage 92 indicate the actual torque of the lower and upper rotors 22, 24 of the main rotor system 12, respectively. The actual torque values indicated for the engine E, translational thrust system 30, and the main rotor system 12 are determined in response to feedback provided by one or more sensors 52 to the control system 40.

A box 108 arranged adjacent the linear gage 92, such as vertically above the linear gage 92 for example, provides a digital, numerical readout of the actual torque of the main rotor system 12, the engine E, and the translational thrust system 30. Accordingly, the box 108 adjacent the linear gage 92 and the symbols 96, 100, 104, 106 associated with the linear gage 92 provide numerical and graphical representation of the actual torque of the main rotor system 12, the engine E, and the translational thrust system 30, respectively. In an embodiment, the box 108 additionally provides a numerical indication of the speed of the rotor system, see numeral 110. In embodiments where the upper and lower rotors 22, 24 are rotating at different speeds, the faster speed will be shown.

The torque indicator 90 may additionally include a collective marker 112 arranged exterior to a side, such as side 98 for example, of the linear gage 92. The collective marker 112 is configured to indicate to an operator of the aircraft 10 an actual value of the collective as measured by one or more sensors 52 of the control system 50. A reference symbol 114, also movable about the height of the linear gage 92, is operable to indicate the commanded collective of the main rotor system 12, as determined by the one or more pilot inputs 56 provided to the control system 40 for example.

In an embodiment, the color of the symbol 96 indicating the engine torque, the symbol 100 indicating the translational thrust torque, the symbols 104, 106 indicating the torque of the upper and lower rotors, and the collective marker 112 vary based on the value of the actual torque relative to the torque limit. For example, each symbol 96, 100, 104, 106, 112 may have a first color, such as green for example, to indicate that the torque of a respective component is at an allowable level. Each symbol 96, 100, 104, 106, 112 may transform to a second color, such as yellow for example, to indicate that the torque of a respective component is approaching a torque limit for that component. Once the torque of a component equals or exceeds the torque limit, the symbol 96, 100, 104, 106, 112 associated with the component may become a third color, such as red for example. Alternatively, or in addition, the numerical readouts provided in the box 108 may change color based depending on the value of the actual torque relative to the torque limit.

The torque indicator 90 illustrated and described herein provides improved situational awareness to an operator of the aircraft 10 with respect to the various aircraft torque levels while requiring a minimal footprint of the display unit 64. As a result, the torque indicator 90 may reduce or even minimize pilot scan times.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A torque indicator for an aircraft having a main rotor system and a translational thrust system driven by at least one engine comprising:
   a first indicator operable to display an actual torque of an engine of the aircraft relative to an engine torque limit; and
   a second indicator operable to display an actual torque of the translational thrust system of the aircraft relative to a translational thrust system torque limit; and
   a third indicator operable to display an actual torque of the main rotor system of the aircraft relative to a main rotor system torque limit.

2. The torque indicator of claim 1, wherein the main rotor system includes an upper rotor system and a lower rotor system, and the third indicator further comprises an indicator operable to display an actual torque of the upper rotor system and an indicator operable to display an actual torque of the lower rotor system.

3. The torque indicator of claim 1, wherein the torque indicator is a linear gage.

4. The torque indicator of claim 1, wherein the first indicator and the second indicator are positioned adjacent sides of the torque indicator and the third indicator is arranged at a center of the torque indicator.

5. The torque indicator of claim 1, further comprising a fourth indicator operable to display a digital, numerical readout of the first indicator, the second indicator, and third indicator.

6. The torque indicator of claim 5, wherein the fourth indicator is operable to display a digital numerical readout of a rotor speed of the main rotor system.

7. The torque indicator of claim 1, further comprising a fourth indicator operable to display a digital, numerical readout of a collective applied to the main rotor system.

8. The torque indicator of claim 7, wherein the fourth indicator is operable to additionally provide a reference collective command provided to the main rotor system.

9. The torque indicator of claim 1, wherein a color of at least one of the first indicator, second indicator, and third indicator, changes as the actual torque approaches the torque limit.

10. The torque indicator of claim 1, wherein the torque indicator is a portion of a multifunction display unit.

11. A method of displaying a torque of various components of an aircraft comprising:
    indicating, via a first indicator, an actual torque of an engine of the aircraft relative to an engine torque limit on a torque display displaying;
    indicating, via a second indicator, an actual torque of a translational thrust system of the aircraft relative to a translational thrust system torque limit on the torque display; and
    indicating, via a third indicator, an actual torque of a main rotor system of the aircraft relative to a main rotor system torque limit on the torque display.

12. The method of claim 11, wherein the torque display includes a linear gage.

13. The method of claim 11, wherein the main rotor system includes a first rotor and a second rotor and indicating an actual torque of a main rotor system of the aircraft relative to a main rotor system torque limit on the torque display further comprises:
    indicating an actual torque of the first rotor relative to the main rotor system torque limit; and
    indicating an actual torque of the second rotor, separate from the first rotor, relative to the main rotor system torque limit.

14. The method of claim 11, further comprising displaying a digital readout of at least one of the actual torque of the engine, the actual torque of the translational thrust system, and the actual torque of the main rotor system.

15. The method of claim 11, further comprising displaying a digital readout of a rotational speed of the main rotor system.

16. The method of claim 11, further comprising displaying an actual value of a collective of the aircraft.

17. The method of claim 11, further comprising indicating a status of at least one of the actual torque of the engine relative to the engine torque limit, the actual torque of a translational thrust system relative to the translational thrust system torque limit, and the actual torque of a main rotor system relative to the main rotor system torque limit.

18. The method of claim 17, wherein at least one of the first indicator, the second indicator, and the third indicator, is a first color when the actual torque of the engine is at an allowable level relative to the engine torque limit, the actual torque of a translational thrust system is at an allowable level relative to the translational thrust system torque limit, and the actual torque of a main rotor system is at an allowable level relative to the main rotor system torque limit, respectively.

19. The method of claim 17, wherein at least one of the first indicator, the second indicator, and the third indicator, is a second color when the actual torque of the engine is approaching the engine torque limit, the actual torque of a translational thrust system is approaching the translational thrust system torque limit, and the actual torque of a main rotor system is approaching the main rotor system torque limit, respectively.

20. The method of claim 17, wherein at least one of the first indicator, the second indicator, and the third indicator, is a second color when the actual torque of the engine equals or exceeds the engine torque limit, the actual torque of a translational thrust system equals or exceeds the translational thrust system torque limit, and the actual torque of a main rotor system equals or exceeds the main rotor system torque limit, respectively.

* * * * *